US008851136B1

(12) United States Patent
Drynkin et al.

(10) Patent No.: US 8,851,136 B1
(45) Date of Patent: Oct. 7, 2014

(54) LABORATORY TUBE PRINTER AND LABELER

(71) Applicants: Alexander V. Drynkin, San Ramon, CA (US); David B. Miller, Orinda, CA (US)

(72) Inventors: Alexander V. Drynkin, San Ramon, CA (US); David B. Miller, Orinda, CA (US)

(*) Notice: Subject to any disclaimer, the term of this patent is extended or adjusted under 35 U.S.C. 154(b) by 0 days.

(21) Appl. No.: 13/798,134

(22) Filed: Mar. 13, 2013

(51) Int. Cl.

| | |
|---|---|
| ***B65C 9/32*** | (2006.01) |
| ***B65C 9/46*** | (2006.01) |
| ***B32B 38/14*** | (2006.01) |
| ***B32B 39/00*** | (2006.01) |
| ***B32B 43/00*** | (2006.01) |
| ***B65C 3/02*** | (2006.01) |

(52) U.S. Cl.
CPC .... *B65C 9/46* (2013.01); *B65C 3/02* (2013.01)
USPC ...... 156/387; 156/538; 156/582; 156/DIG. 6; 156/DIG. 9; 156/DIG. 11; 156/DIG. 12; 156/DIG. 13; 156/DIG. 33; 156/DIG. 40; 156/DIG. 47

(58) Field of Classification Search
CPC ........... B29C 66/80; B29C 73/30; G09F 3/02; G09F 3/10; B32B 38/14; B65C 3/00; B65C 3/02; B65C 3/06; B65C 3/065; B65C 3/08; B65C 3/10; B65C 3/12; B65C 3/14; B65C 3/16; B65C 9/02; B65C 9/04; B65C 9/08; B65C 9/1865; B65C 9/1869; B65C 9/1873; B65C 9/26; B65C 9/30; B65C 9/46; B65C 11/021; B65C 11/0289; B65C 2210/0075
USPC ......... 156/247, 249, 277, 289, 384, 387, 538, 156/580–582, DIG. 5, DIG. 6, DIG. 8, 156/DIG. 9, DIG. 11, DIG. 12, DIG. 13, 156/DIG. 33, DIG. 39, DIG. 40, DIG. 47
See application file for complete search history.

(56) References Cited

U.S. PATENT DOCUMENTS

| | | | | | |
|---|---|---|---|---|---|
| 4,561,921 | A | * | 12/1985 | Treiber | 156/297 |
| 4,612,076 | A | * | 9/1986 | Moss | 156/249 |
| 4,630,067 | A | * | 12/1986 | Teraoka | 347/180 |
| 4,669,381 | A | * | 6/1987 | Nakajima | 101/288 |
| 4,706,095 | A | * | 11/1987 | Ono et al. | 347/222 |

(Continued)

FOREIGN PATENT DOCUMENTS

| | | | | |
|---|---|---|---|---|
| CA | 2105741 | C | * | 3/1997 |
| EP | 768611 | A2 | * | 4/1997 |

(Continued)

OTHER PUBLICATIONS

English Abstract of JP 07-132917 (Mar. 9, 2014).*

(Continued)

*Primary Examiner* — Sing P Chan
(74) *Attorney, Agent, or Firm* — Richard Esty Peterson

(57) ABSTRACT

A laboratory tube printer and labeler for labeling laboratory tubes with printed labels, the tube printer and labeler advantageously accommodating an automated tube handling device having a robotic pickup and placement mechanism where the tube printer and labeler has a housing having an upper deck with a printing station and a tube labeling and pickup station displaced from the printing station such that the labeling and pickup station can be accessed by the robotic pickup and placement mechanism wherein a printed label is transported to the labeling and pickup station and applied to a laboratory tube placed in the labeling and pickup station.

10 Claims, 6 Drawing Sheets

(56) References Cited

U.S. PATENT DOCUMENTS

| | | | | | |
|---|---|---|---|---|---|
| 4,706,096 | A | * | 11/1987 | Sato | 347/218 |
| 4,734,710 | A | * | 3/1988 | Sato et al. | 347/171 |
| 4,746,932 | A | * | 5/1988 | Sato | 347/171 |
| 4,861,553 | A | * | 8/1989 | Mawhirt et al. | 422/65 |
| 5,040,461 | A | * | 8/1991 | Van-Ocker | 101/288 |
| 5,401,110 | A | * | 3/1995 | Neeley | 400/621 |
| 5,688,361 | A | * | 11/1997 | Itoh | 156/362 |
| 5,730,816 | A | * | 3/1998 | Murphy | 156/64 |
| 5,752,723 | A | * | 5/1998 | Robertson | 283/67 |
| 5,801,736 | A | * | 9/1998 | Ikkatai et al. | 347/86 |
| 5,814,276 | A | * | 9/1998 | Riggs | 422/65 |
| 5,833,379 | A | * | 11/1998 | Kano | 400/615.2 |
| 5,893,263 | A | * | 4/1999 | Matsumoto et al. | 156/387 |
| D410,677 | S | * | 6/1999 | Matsumoto et al. | D18/53 |
| 6,113,554 | A | * | 9/2000 | Gilcher et al. | 600/573 |
| 6,120,429 | A | * | 9/2000 | Walters | 494/37 |
| 6,142,688 | A | * | 11/2000 | Saito | 400/621 |
| 6,535,299 | B1 | * | 3/2003 | Scherz | 358/1.18 |
| D497,674 | S | * | 10/2004 | Roberts | D24/229 |
| 7,303,342 | B2 | * | 12/2007 | Yamamoto et al. | 400/62 |
| 7,409,977 | B2 | * | 8/2008 | Rice et al. | 156/443 |
| 7,478,956 | B2 | * | 1/2009 | Sanbongi et al. | 400/611 |
| 7,857,532 | B2 | * | 12/2010 | Takatsuka | 400/208 |
| 7,918,402 | B2 | * | 4/2011 | Conlon et al. | 235/491 |
| 7,922,073 | B2 | * | 4/2011 | de la Huerga | 235/375 |
| 8,079,510 | B2 | * | 12/2011 | Vandermeulen et al. | 235/375 |
| 8,210,351 | B2 | * | 7/2012 | Miceli et al. | 206/459.5 |
| 8,246,261 | B2 | * | 8/2012 | Takatsuka | 400/223 |
| 8,276,623 | B2 | * | 10/2012 | Van Vreeland et al. | 141/27 |
| 8,276,632 | B2 | * | 10/2012 | Kim et al. | 156/361 |
| 8,510,233 | B1 | * | 8/2013 | Leon et al. | 705/410 |
| 2002/0154933 | A1 | * | 10/2002 | Kalette | 400/615.2 |
| 2005/0019943 | A1 | * | 1/2005 | Chaoui et al. | 436/165 |
| 2005/0106747 | A1 | * | 5/2005 | Chaoui et al. | 436/165 |
| 2006/0037709 | A1 | * | 2/2006 | Itoh | 156/446 |
| 2006/0082637 | A1 | * | 4/2006 | Sanbongi et al. | 347/213 |
| 2006/0153620 | A1 | * | 7/2006 | Takatsuka | 400/208 |
| 2007/0204497 | A1 | * | 9/2007 | de la Huerga | 40/630 |
| 2007/0210164 | A1 | * | 9/2007 | Conlon et al. | 235/462.01 |
| 2008/0271852 | A1 | * | 11/2008 | Giacalone | 156/361 |
| 2008/0295952 | A1 | * | 12/2008 | Rice et al. | 156/227 |
| 2009/0154979 | A1 | * | 6/2009 | Takatsuka | 400/231 |
| 2010/0252203 | A1 | * | 10/2010 | Kim et al. | 156/538 |
| 2010/0252474 | A1 | * | 10/2010 | Miceli et al. | 206/459.5 |
| 2011/0043591 | A1 | * | 2/2011 | Takatsuka | 347/217 |
| 2011/0114263 | A1 | * | 5/2011 | Pedrazzini | 156/378 |
| 2011/0281346 | A1 | * | 11/2011 | Halpern et al. | 435/307.1 |
| 2012/0004770 | A1 | * | 1/2012 | Ooyen et al. | 700/235 |
| 2012/0122231 | A1 | * | 5/2012 | Tajima | 436/164 |
| 2013/0092700 | A1 | * | 4/2013 | Braunstein | 221/13 |
| 2013/0133824 | A1 | * | 5/2013 | Kian et al. | 156/264 |
| 2013/0270339 | A1 | * | 10/2013 | Westra et al. | 235/375 |

FOREIGN PATENT DOCUMENTS

| | | | | |
|---|---|---|---|---|
| EP | 819470 | A1 | * | 1/1998 |
| FR | 2759347 | A1 | * | 8/1998 |
| JP | 04154534 | A | * | 5/1992 |
| JP | 05097133 | A | * | 4/1993 |
| JP | 07132917 | A | * | 5/1995 |
| JP | 07213586 | A | * | 8/1995 |
| JP | 07300119 | A | * | 11/1995 |
| JP | 08238809 | A | * | 9/1996 |
| JP | 08324527 | A | * | 12/1996 |
| JP | 10007119 | A | * | 1/1998 |
| JP | 10059336 | A | * | 3/1998 |
| JP | 10059339 | A | * | 3/1998 |
| JP | 10077014 | A | * | 3/1998 |
| JP | 10139023 | A | * | 5/1998 |
| JP | 2000247315 | A | * | 9/2000 |
| JP | 2000266755 | A | * | 9/2000 |
| JP | 2002211525 | A | * | 7/2002 |
| JP | 2003083985 | A | * | 3/2003 |
| JP | 2008302934 | A | * | 12/2008 |
| WO | WO 2006097813 | A1 | * | 9/2006 |
| WO | WO 2010003880 | A1 | * | 1/2010 |

OTHER PUBLICATIONS

English Abstract of JP 07-213586 (Mar. 9, 2014).*
English Abstract of JP 07-300119 (Mar. 9, 2014).*
English Abstract of JP 08-324527 (Mar. 9, 2014).*
English Abstract of JP 10-007119 (Mar. 9, 2014).*
English Abstract of JP 10-059336 (Mar. 9, 2014).*
English Abstract of JP 10-139023A (Mar. 9, 2014).*
English Abstract of FR 2759347 (Mar. 9, 2014).*
English Abstract of JP 2008-302934 (Mar. 9, 2014).*
English Abstract of JP 04-154534 (Mar. 9, 2014).*
English Abstract of JP 05-097133 (Mar. 9, 2014).*
English Abstract of JP 08-238809 (Mar. 9, 2014).*
English Abstract of JP 10-059339 (Mar. 9, 2014).*
English Abstract of JP 10-077014 (Mar. 9, 2014).*
English Abstract of JP 2000-247315 (Mar. 9, 2014).*
English Abstract of JP 2003-083985 (Mar. 9, 2014).*
English Abstract of JP 2000-266755 (Mar. 9, 2014).*
English Abstract of JP 2002-211525 (Mar. 9, 2014).*

* cited by examiner

LABORATORY TUBE PRINTER AND LABELER

BACKGROUND OF THE INVENTION

This invention relates to an automated tube handling device for laboratory tubes and other cylindrical vessels typically processed in a laboratory or medical facility, and in particular, the invention relates to a laboratory tube printer and labeler.

The laboratory tube printer and labeler is designed to cooperate with an automated robotic tube processor that has a robotically controlled pickup and placement mechanism that can deliver a laboratory tube, vial, bottle or other relatively small vessel commonly processed in batches with individual control numbers or bar codes such that for each tube labeled, a different label print marking may be required.

This requirement complicates the label printing and label applying process, particularly when the apparatus for printing the label and labeling the tube is desired as an auxiliary component to the automated robotic tube processing apparatus. In such instance the station where the tube is deposited by the pickup and placement mechanism must be located within the field of access of the robotic device to facilitate automation.

The laboratory tube printer and labeler of this invention is designed to accommodate many robotic tube handling devices by presenting the deposit and pickup station at a location for convenient access by the robotic pickup and placement mechanism of an associated automated tube handler. Additionally, the laboratory tube printer and labeler is designed to accommodate both batch processing of identical printed and applied labels as well as those circumstances where each label is differently marked. Furthermore, the design is sufficiently flexible that tubes of different sizes within a range can be labeled with printed labels.

SUMMARY OF THE INVENTION

The laboratory tube printer and labeler of this invention is designed for cooperative operation with an automated tube handler having a robotically controlled pickup and placement mechanism. However, the laboratory tube printer and labeler, or tube labeler can be an independent standalone component that can present a printed and labeled tube to a tube labeling and pickup station where a tube can be manually placed and retrieved.

The versatile design is adapted to utilize rolls of labels on a tape where the labels are closely spaced for economy in a conventional manner. To enable individual labels to be printed with indicia or markings that are unique to a particular label and corresponding laboratory tube, the transport system for the labeling operation is reversible. In this manner, the printed label can be presented to a labeling station that is displaced from the printing station. The tube to be labeled with a printed label can therefor be placed and retrieved at a single location, without the tube being relocated.

By displaced it is meant that one or more labels may be carried on a label tape between the printing station and the labeling station. To insure that the correct label is applied to the correct tube, the applied label is examined by an electronic sensor. The next in line unprinted label can be returned to the printing station by reversing the transport of the label tape to situate the next in line unprinted label at the printing station for printing. This feature, of course, is not necessary where all labels in a batch of laboratory tubes are identical.

DETAILED DESCRIPTION OF THE PREFERRED EMBODIMENT

Figure 1:
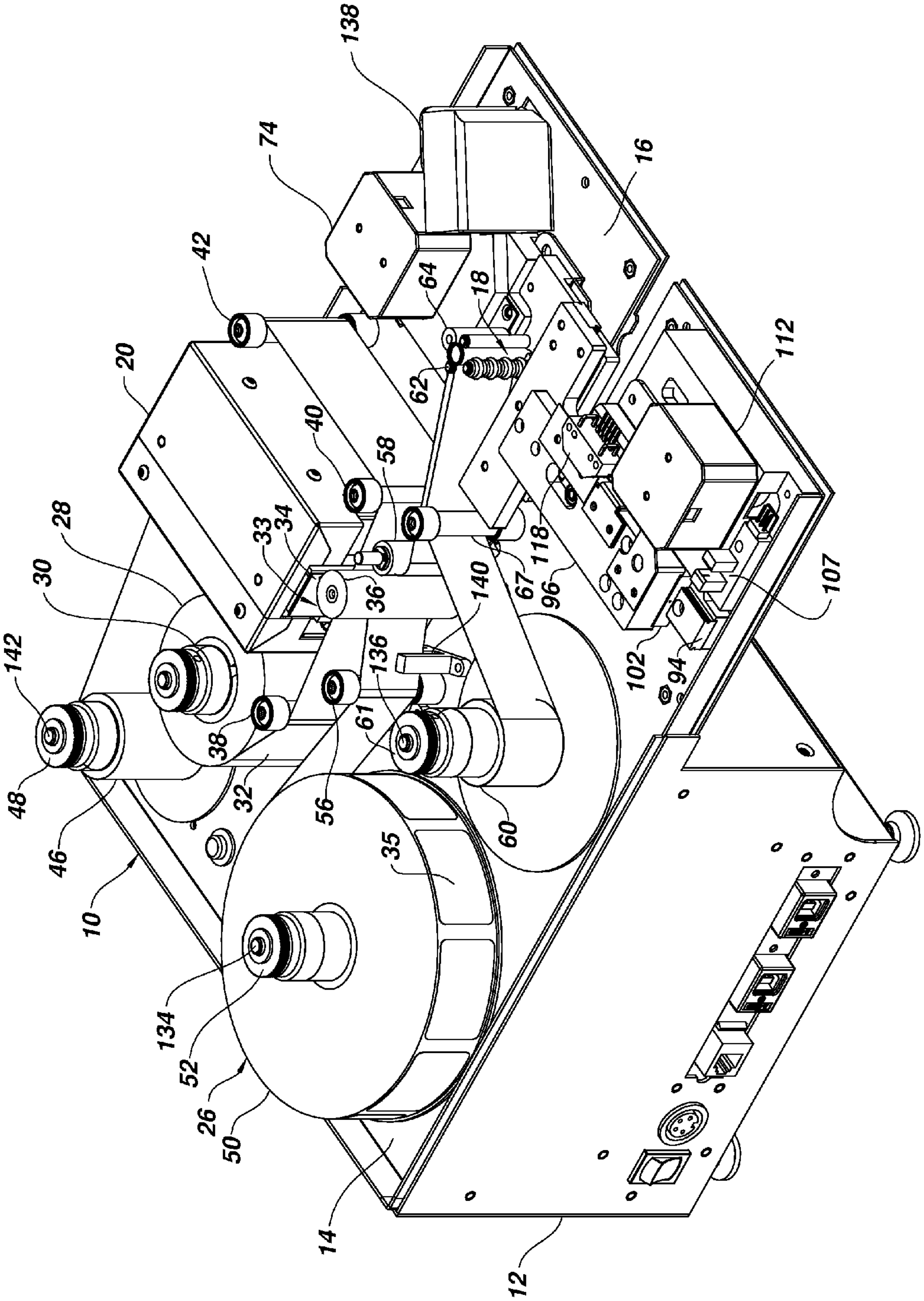
FIG. 1 is a perspective view of the laboratory tube printer and labeler of this invention.
Figure 2:
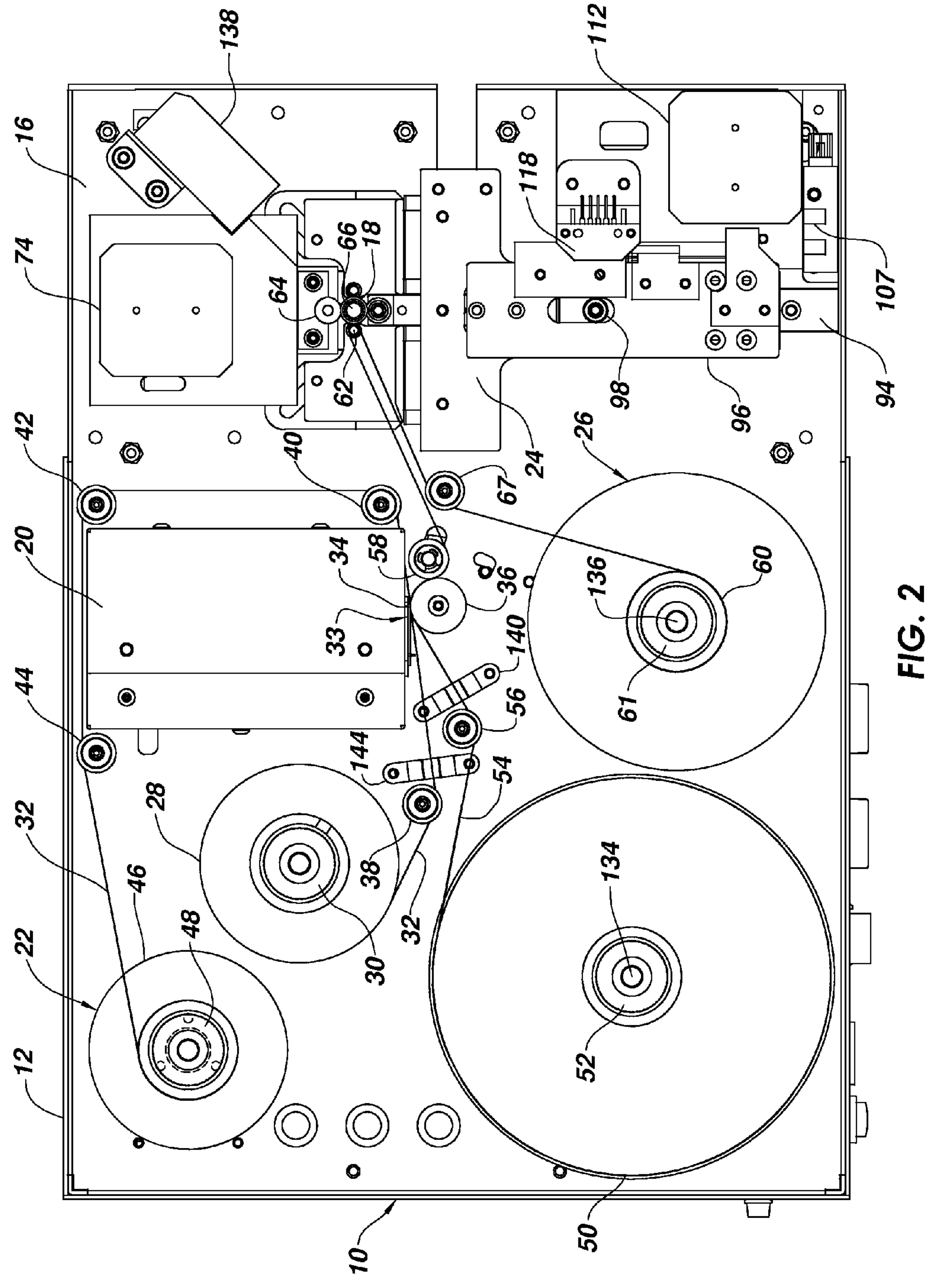
FIG. 2 is a plan view of the tube printer and labeler of FIG. 1.
Figure 3:
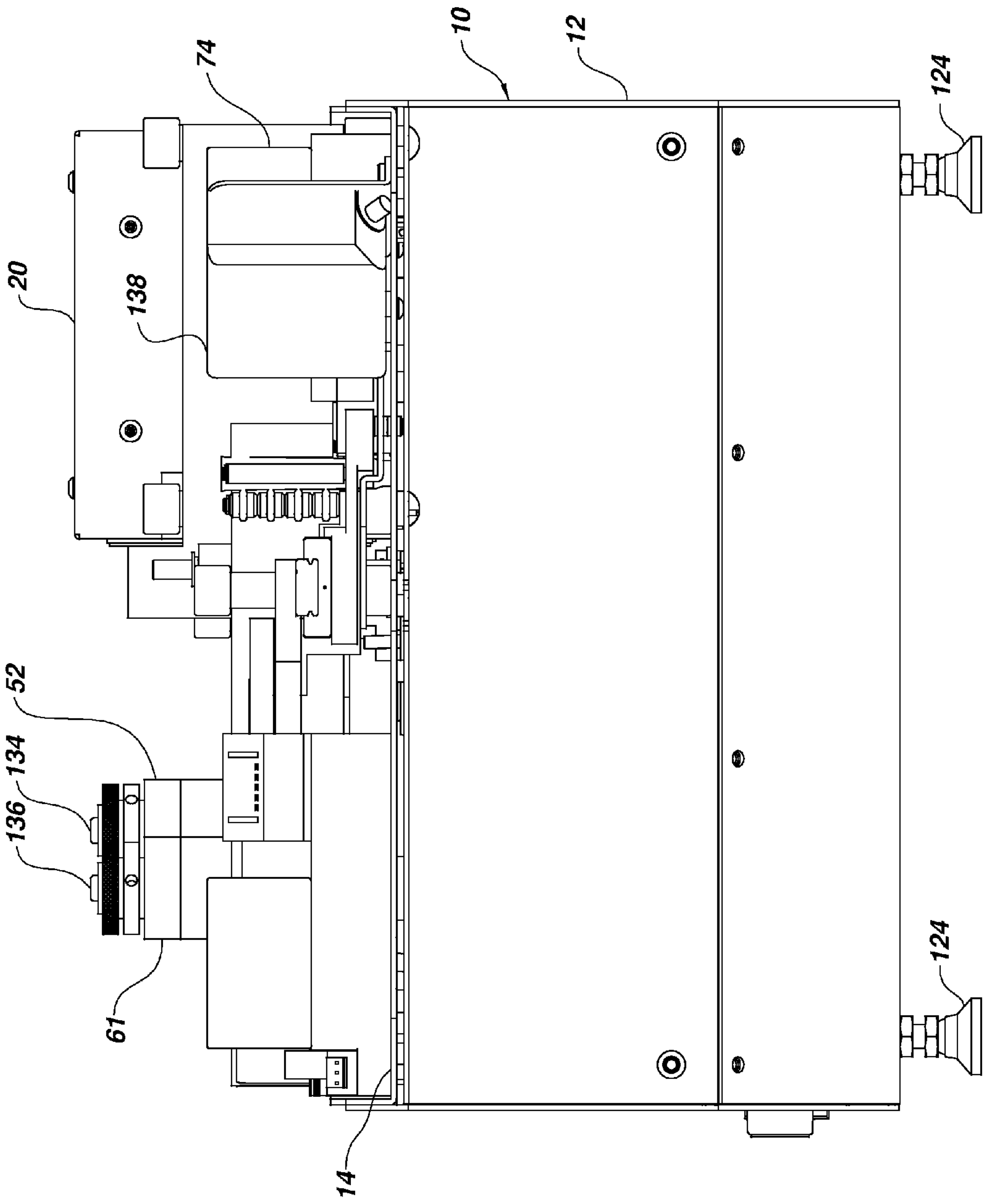
FIG. 3 is an end elevational view of the printer and labeler of FIG. 1.

The laboratory tube printer and labeler shown in the perspective view of FIG. 1 is designated generally by the reference numeral 10. The laboratory tube printer and labeler 10, or tube labeler for convenience, is also shown in the orthogonal views of FIGS. 2-4 as a self-contained component that is typically used as an accessory to a robotic tube processor in a laboratory or medical facility for automated handling of test tubes, vials, bottles and other cylindrical test vessels.

As a component accessory, the tube labeler 10 is configured as a desktop device that is designed to couple with a robotic tube processor and includes a housing 12 with a top deck 14. In the preferred embodiment of the tube labeler, the top deck 14 has a cantilevered portion 16 with a tube labeling and pickup station 18 that can project over the deck of an adjacent robotic tube processor. This positioning will enable a pickup mechanism of the robotic tube processor to place a tube at the tube labeling pickup station 18 and to retrieve the tube when labeled.

As shown in the drawings, the tube labeler 10 has a thermal transfer printer 20 with a print ribbon transport assembly 22 and a labeler 24 with a label tape transport assembly 26.

The print ribbon transport assembly 22 has a print ribbon supply reel 28 on a spindle 30 that supplies thermal print ribbon 32 to a printing station 33. At the printing station 33 a print head 34 of the thermal transfer printer 20 is advanced and the print ink on the print ribbon 32 is thermally transferred to a label 35 rounding the backside of a transfer drum 36. A guide roller 38 directs the print ribbon 32 to the print head 34 and a series of guide rollers 40, 42 and 44 guides the print ribbon 32 around the thermal printer 20 to a take-up reel 46 on a take-up spindle 48. The print head 34 is advanced and retracted by a conventional spring-loaded solenoid actuator (not shown) in the transfer printer 20 to mark the label 35 with a bar code, text, symbols or other markings useful to the user.

The label tape transport assembly 26 similarly has a label tape supply reel 50 on a spindle 52 that supplies label tape 54 with closely spaced, peel-off labels 35 to the printing station 33 guided by guide roller 56. The label tape 54 with the printed label is then guided by clamp 58 to the labeling and pickup station 18 before being guided without the label to a tape take-up reel 60 on a spindle 61.

Figure 5:
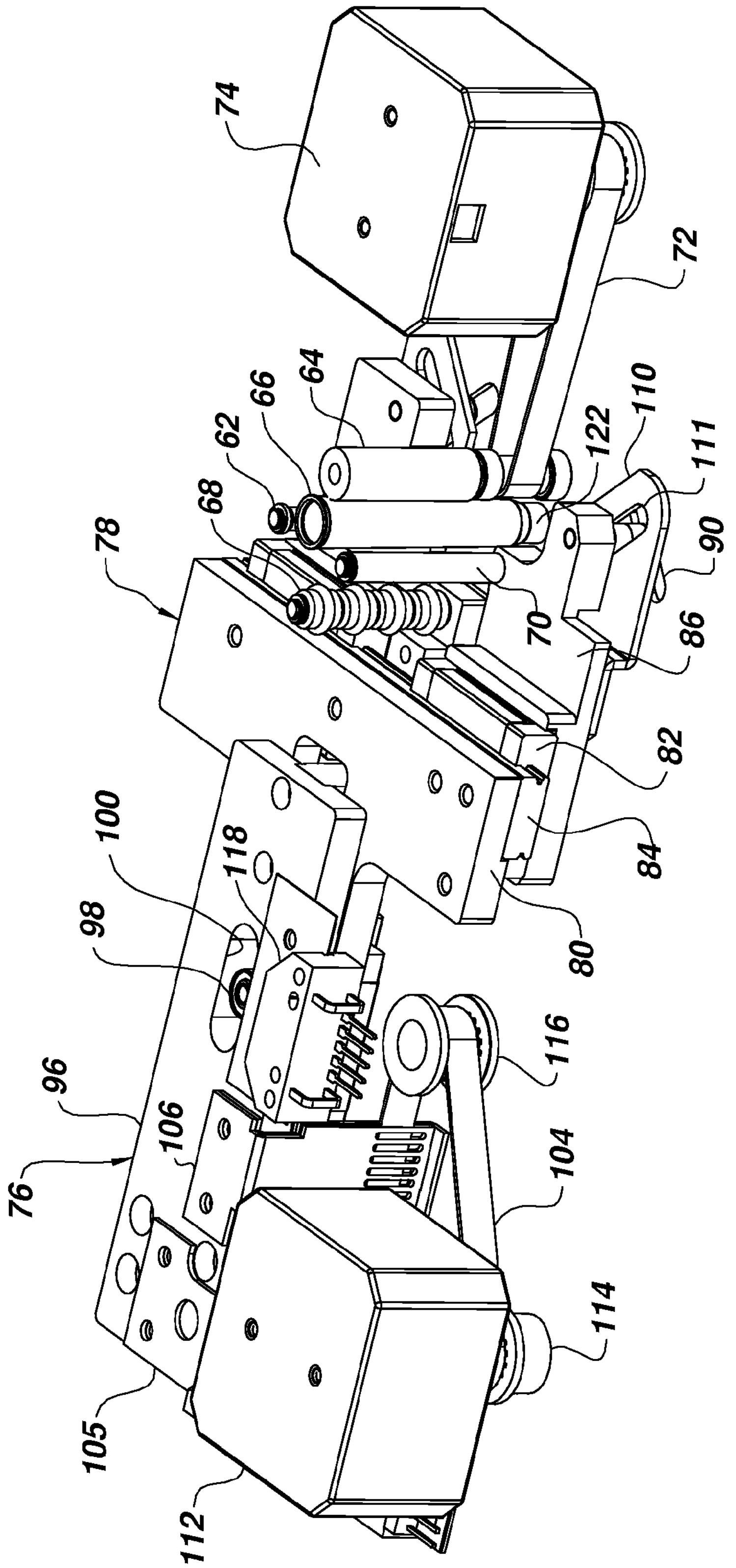
FIG. 5 is an enlarged perspective view of the labeler as shown in FIG. 2.
Figure 6:
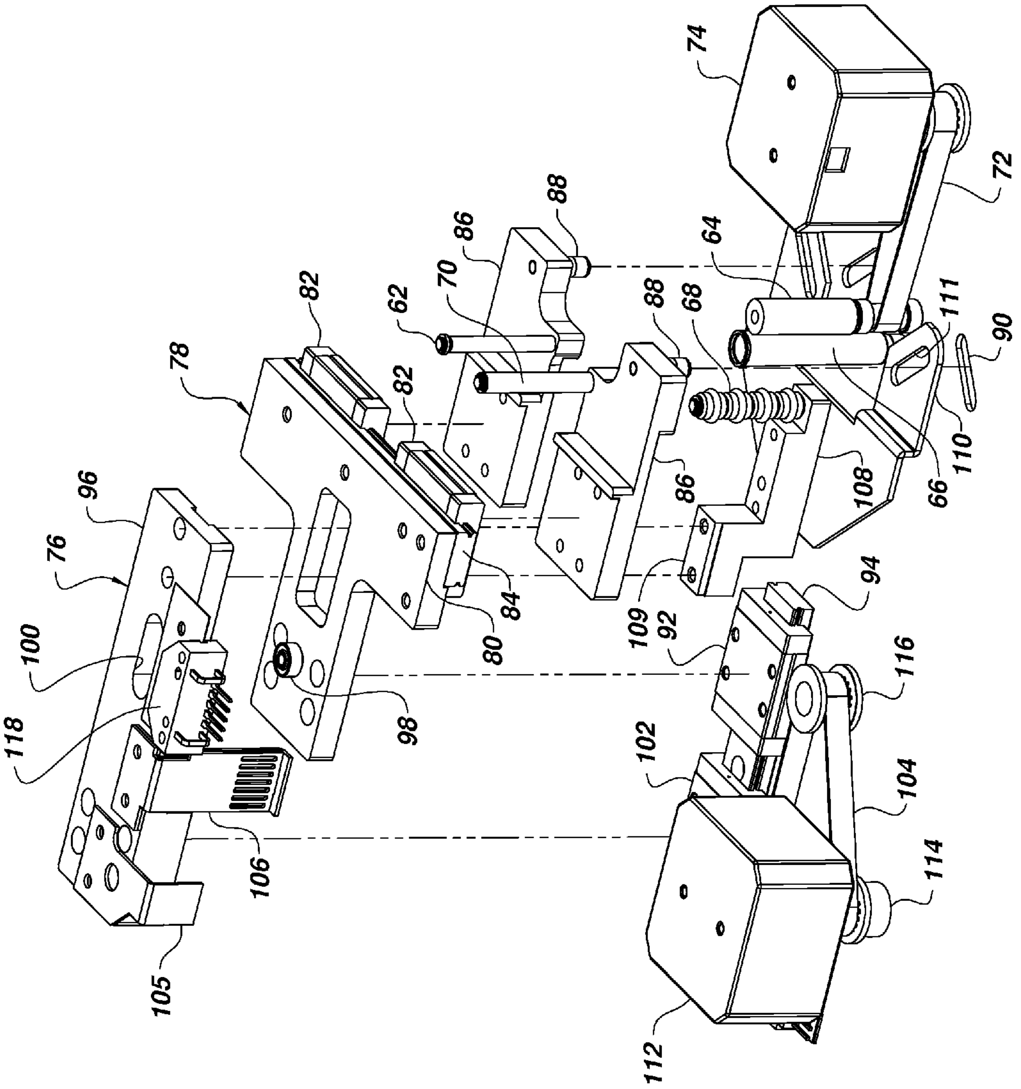
FIG. 6 is an exploded view of the labeler of FIG. 5.

At the labeling and pickup station 18 a small diameter switchback roller 62 cooperates with a pressing drum 64 to press the label against a laboratory tube 66 located at the tube labeling and pickup station 18. The label 35 carried on the label tape 54 is unable to make the switchback around the switchback roller 62 and peels off against the tube 66. The label tape 54 without the label 35 is guided by a guide roller 67 to the take-up reel 60. The peeling label 35 is urged against the tube by the controlled rotation of the pressing drum 64. The tube is pressed against the pressing drum 64 by a cushioned roller 68 located opposite the pressing drum 64. The pressing drum 64, shown in FIGS. 5 and 6, has a fixed axis location and driven by a belt 72 connected to a drive motor 74.

The cushioned roller 68, the switchback roller 62 and the small diameter roller 70 are mounted at the end of a linear actuator assembly 76 to hold the tube 66 in place and allow the label 35 to be rolled on against the tube 66 by rotation of the pressing drum 64 in combination with the controlled feed of the label tape 54.

The linear actuator assembly 76 includes a spanner mechanism 78 on which the switchback roller 62 and the small diameter roller 70 are mounted to assist in maintaining the position of the tube 66 for various diameter tubes. The spanner mechanism has a T-bar 80 that supports the elements for a controlled transverse movement during linear reciprocation of the actuator assembly during the sequence of labeling. The spanner mechanism 78 includes opposed slide carriages 82 on cross rail 84 attached to the underside of the T-bar 80. The slide carriages 82 have fingers 86 with cam rollers 88 that engage cam slots 90 in the deck 14. As the spanner mechanism 78 with the T-bar 80 advances toward the pressure drum 64 the switchback roller 62 and opposed small diameter roller 70 converge. In this manner the switchback roller 62 and the small diameter roller 70 maintain the positioning of the tube 66 during the labeling operation.

The T-bar 80 of the spanner mechanism 78 is supported on a first carriage 92 on a linear guide rail 94 and slideably engaged with an actuator arm 96 by a bearing pin 98 and displacement limit slot 100. The actuator arm 96 is mounted on a second carriage 102 on the same guide rail 94 and is reciprocated by a drive belt 104 connected to a depending slotted tab 106 mounted to the actuator arm 96. A depending sensor flag 105 is also connected to the end of the actuator arm 96 and cooperates with a stationary optical sensor 107 on the deck 14 to limit displacement of the actuator arm 96.

Connected to the other end of the actuator arm 96 for unitary movement with the arm is an extension mount 108. The extension mount 108 has a connection leg 109 that passes through an opening in the T-bar 80 to fasten to the end of the actuator arm 96. This construction allows some movement of the actuator arm 96 independent of the more limited movement of the spanner mechanism 78. At the distal end of the extension mount 108 is the cushioned roller 68. On the underside of the extension mount 108 is a guide plate 110 with guide slots 111 for the cam rollers 88.

The cushioned roller 68 is directly connected to the actuator arm 96 and is the lead element to contact a tube 66 located in the labeling and pickup station 18. Actuation of the linear actuator assembly 76 is accomplished by operation of a two-way drive motor 112 with a drive capstan 114 that transports the drive belt 104 around a pair of idler wheels 116 (one shown in FIGS. 5 and 6).

The two-way drive motor 112 is preferably a reversible stepping motor that transports the linear actuator assembly 76 back and forth on its guide rail 94 to facilitate the receipt, labeling and release of a tube 66 at the labeling and pickup station 18. Detection of the position of the linear actuator assembly 76 is provided by a position sensor 118 that provides data to calculate reciprocal displacements of the actuator arm 96. The displacement of the spanner mechanism 78 lags the displacement of the actuator arm 96 and limits the transverse movement of the switchback roller 62 and small diameter roller 70 to a fraction of the displacement of the actuator arm 96 and cushioned roller 68.

It is understood that when a tube is absent from the labeling and pickup station 18, that event is detected by the position sensor 118 and appropriate action is taken. When a tube size has changed, this event is also detected by the position sensor 118 and adjustments are made. Typically, the tube 66 seats on a pedestal 122 that is optionally provided with a probe for a 2D bar code reader for reading any bar code on the bottom of a particular type of tube. The presence or absence of a tube 66 can also be determined by this alternate or cumulative method.

Figure 4:
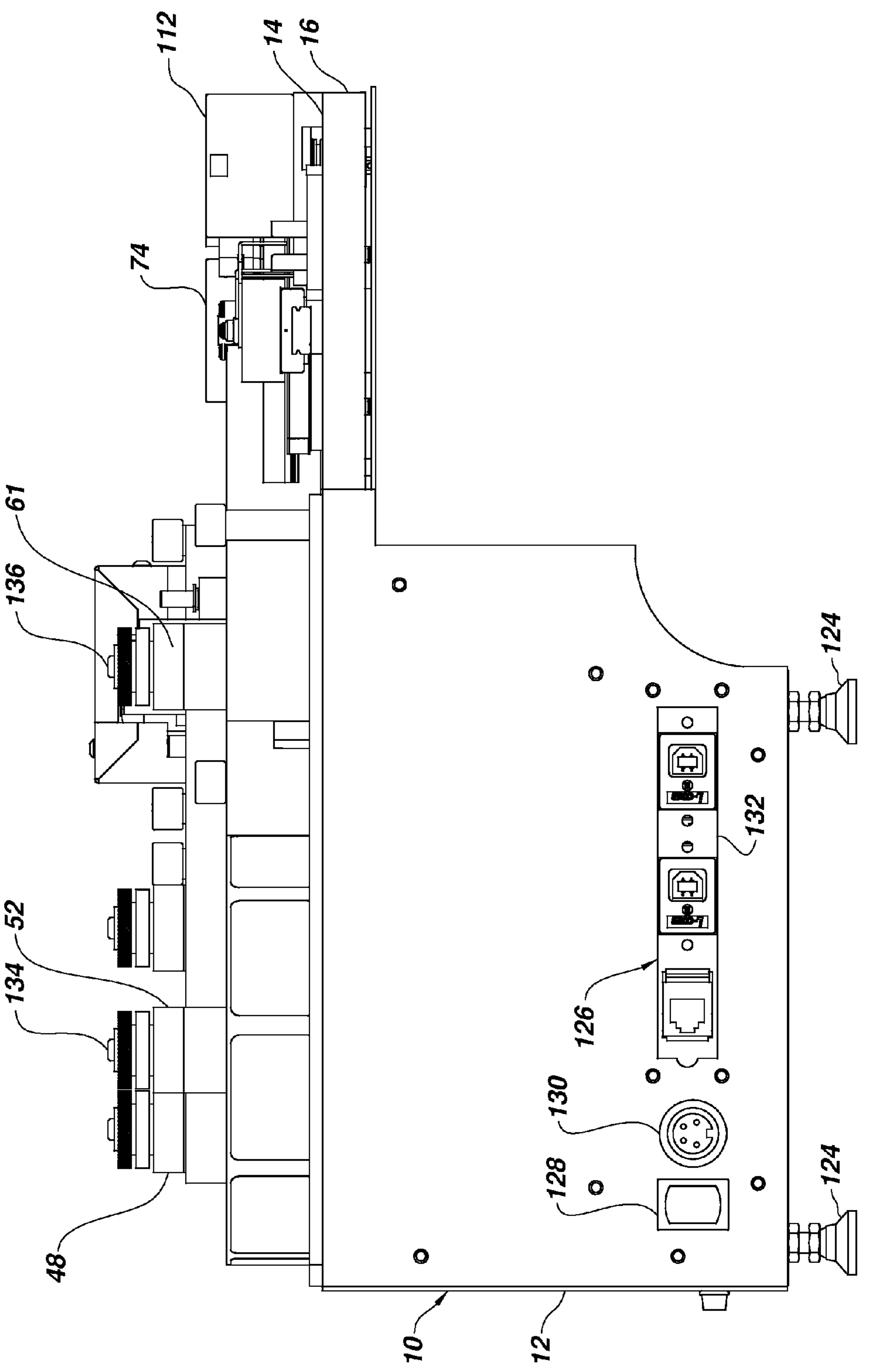
FIG. 4 is a side elevational view of the printer and labeler of FIG. 1.

Returning to the side elevational view of FIG. 4, the profile of the housing 12 and the cantilevered portion 16 of the top deck 14 is illustrated. To accommodate any adjustment necessary for matching the elevation of the labeling and pickup station 18 to the robotic pickup mechanism of the associated robotic tube processor, the housing 12 includes adjustable feet 124. The housing 12 additionally contains electronics and a system controller (not visible) that coordinate the system operation.

As shown in FIG. 4, the housing 12 has an input/output panel 126 with a power switch 128, a specialty power terminal 130 and a series of communication ports 132 to facilitate the connection of the tube labeler 10 to a general purpose computer or remote host processor programmed to operate the sequences desired by the ultimate user. It is to be understood that in addition to the internal controller the tube labeler 10 can include an internal programmable processor and input/output touchscreen to maximize its function as a standalone unit, if desired.

To efficiently achieve the required flexibility in operation, the spindle 52 of the label tape supply reel 50 of label tape transport assembly 26 has a bi-directional drive and clutch assembly 134 in part contained within the housing 12 below the top deck 14. Similarly, the spindle 61 of the take-up reel 60 has a bi-directional drive and clutch assembly 136.

The bi-directional drive and clutch assemblies 134 and 136 for the tape transport assembly 26 allow the control system to reverse the tracking of the label tape 54. In this manner, the labeling and pickup station 18 can be displaced from the label printer 20 to facilitate pickup by the pickup mechanism of an associated robotic tube processor. In the embodiment of this invention, the displacement distance of the labeling and pickup station 18 from the printing station 33 is a multiple of labels 35 on the label tape 54. Each label can be individually programmed for specialty markings and checked by an electronic sensor 138 on the top deck 14 of the tube labeler. The electronic sensor 138 is preferably a bar code reader, but may optionally be a character reader, symbol reader, rf reader or other device to confirm the correct printing and labeling of the resident tube. Enabling the label tape 54 to back up by reversing the drive and maintaining tension on the tape allows the labels to be closely spaced with the next in order label to be returned to the printing station 33 for printing. Detection and tracking of the labels on the label tape is accomplished by a tape label sensor 140, which detects the edge of the labels as they pass the sensor 140 mounted on the deck 14.

The print ribbon transport assembly 22 has a one-directional drive 142 on the take-up spindle 48 of the take-up reel and a clutch on the spindle 30 of the print ribbon supply reel 28, since there is no need to reverse the thermal print ribbon 32. A ribbon sensor 144 mounted on the deck 14 detects the presence of the print ribbon 32 and signals when the ribbon supply reel 28 is exhausted and the end of the ribbon passes the sensor 144.

The laboratory tube printer and labeler 10 of this invention is designed for automation and coordinated operation with a robotic laboratory tube processor. Therefore, the programmed controller is typically under the master control of a programmable host computer having the typical tools for inputting the parameters of operation and storing the records developed. Physical control of the mechanical system including the basic protocols for operation is coordinated by the internal controller utilizing the input from the various sensors to control operations within the constraints applied.

The invention claimed is:

1. A laboratory tube printer and labeler for labeling laboratory tubes with printed labels, the tube printer and labeler advantageously accommodating an automated tube handling device having a robotic pickup and placement mechanism comprising:

a housing having an upper deck with a printing station and a tube labeling and pickup station displaced from the printing station;

a label tape transport assembly having a first spindle for a label tape supply reel and a second spindle for a label tape take-up reel;

a ribbon transport assembly having a first spindle for a print ribbon supply reel and a second spindle for a print ribbon take-up reel;

a thermal transfer printer having a print head located at the printing station;

a plurality of guides to guide a label tape with labels to the printing station and to guide a print ribbon to the printing station between the label tape and the print head of the thermal transfer printer;

a plurality of guides to guide a label tape with printed labels to the tube labeling and pickup station; and, a positioning mechanism having an actuator that releaseably positions a laboratory tube at the tube labeling and pickup station wherein a printed label is applied to the tube, wherein the first spindle and second spindle each have a spindle drive that selectively transports a label tape in a forward and reverse direction.

2. The laboratory tube printer and labeler of claim 1 wherein the tube labeling and pickup station is displaced a distance from the printing station and the labels have a length, wherein the distance of displacement of the tube labeling and pickup station from the printing station is the length of at least one label on the label tape.

3. The laboratory tube printer and labeler of claim 2 wherein the upper deck has an extension portion that cantilevers from the housing and the tube labeling and pickup station is located on the extension portion of the upper deck.

4. The laboratory tube printer and labeler of claim 3 in combination with an adjacent laboratory tube handler having a robotic pickup mechanism having a range of operation wherein the tube labeling and pickup station is located within the range of operation of the robotic pickup mechanism for placement and pickup of a laboratory tube at the tube labeling and pickup station.

5. The laboratory tube printer and labeler of claim 1 wherein the second spindle for the print ribbon take-up reel has a spindle drive for taking up the print ribbon and the first spindle for the print ribbon supply has a clutch to maintain a tension in the print ribbon during transport.

6. The laboratory tube printer and labeler of claim 1 wherein the tube labeling and pickup station includes a pressure drum with a rotational drive for pressing a label on a tube positioned in the tube labeling and pickup station.

7. The laboratory tube printer and labeler of claim 6 wherein the actuator of the positioning mechanism has an arm with a roller positioned opposite the pressure drum to urge a tube positioned in the tube labeling and pickup station against the pressure drum on actuation of the actuator.

8. The laboratory tube printer and labeler of claim 7 wherein the actuator of the positioning mechanism has a reciprocal drive to displace the arm and roller on a path toward and away from the pressure drum and wherein the actuator has a spanner mechanism with opposed rollers wherein the opposed rollers of the spanner mechanism have a tracking path transverse to the path of the arm and roller.

9. The laboratory tube printer and labeler of claim 8 wherein one of the opposed rollers is a small diameter switchback roller that carries labels on the label tape to the tube labeling and pickup station on a switchback path wherein labels are unable to make the switchback and peel off against a tube located in the tube labeling and pickup station.

10. The laboratory tube printer and labeler of claim 9 wherein the opposed rollers are concurrently displaced together and apart on actuation of the actuator to hold and release a tube located in the tube labeling and pickup station.

* * * * *